(12) United States Patent
Thoemmes

(10) Patent No.: US 11,991,094 B2
(45) Date of Patent: *May 21, 2024

(54) METADATA DRIVEN STATIC DETERMINATION OF CONTROLLER AVAILABILITY

(71) Applicant: Red Hat, Inc., Raleigh, NC (US)

(72) Inventor: Markus Thoemmes, Grasbrunn (DE)

(73) Assignee: Red Hat, Inc., Raleigh, NC (US)

(*) Notice: Subject to any disclaimer, the term of this patent is extended or adjusted under 35 U.S.C. 154(b) by 55 days.

This patent is subject to a terminal disclaimer.

(21) Appl. No.: 17/738,918

(22) Filed: May 6, 2022

(65) Prior Publication Data

US 2022/0263772 A1  Aug. 18, 2022

Related U.S. Application Data

(63) Continuation of application No. 16/913,367, filed on Jun. 26, 2020, now Pat. No. 11,336,588.

(51) Int. Cl.
| | | |
|---|---|---|
| *G06F 15/16* | (2006.01) | |
| *G06F 9/54* | (2006.01) | |
| *G06F 16/907* | (2019.01) | |
| *H04L 47/70* | (2022.01) | |
| *H04L 47/762* | (2022.01) | |
| *H04L 47/78* | (2022.01) | |

(52) U.S. Cl.
CPC ............ *H04L 47/821* (2013.01); *G06F 9/541* (2013.01); *G06F 16/907* (2019.01); *H04L 47/762* (2013.01); *H04L 47/788* (2013.01)

(58) Field of Classification Search
CPC .... H04L 47/821; H04L 47/762; H04L 47/788
See application file for complete search history.

(56) References Cited

U.S. PATENT DOCUMENTS

| | | | |
|---|---|---|---|
| 10,599,500 B2 | 3/2020 | Caldato et al. | |
| 11,010,218 B1 | 5/2021 | Karaya | |
| 11,119,824 B2 | 9/2021 | Clampitt, III et al. | |
| 11,194,483 B1 | 12/2021 | Dontu et al. | |
| 11,226,905 B2 * | 1/2022 | Gupta | G06F 3/0643 |
| 11,316,822 B1 * | 4/2022 | Gawade | H04L 61/5061 |
| 2011/0283267 A1 * | 11/2011 | Waite | G06F 11/3672 717/135 |

(Continued)

FOREIGN PATENT DOCUMENTS

| | | |
|---|---|---|
| CN | 109960585 A | 7/2019 |
| CN | 106936636 B | 8/2019 |

(Continued)

OTHER PUBLICATIONS

Unknown Author, "Kubernetes Custom Resource Definitions: CRD's Explained," https://www.bmc.com/blogs/kubernetes-crd-custom-resource-definitions/, 4 pages.

*Primary Examiner* — Hieu T Hoang
(74) *Attorney, Agent, or Firm* — Womble Bond Dickinson (US) LLP

(57) ABSTRACT

Systems and methods for determining if a controller that can service a custom resource (CR) exists are disclosed. The method includes evaluating a custom resource (CR) and determining whether a controller among a plurality of controllers can service the CR based on filter metadata associated with each of the plurality of controllers.

17 Claims, 6 Drawing Sheets

(56) References Cited

U.S. PATENT DOCUMENTS

| | | |
|---|---|---|
| 2019/0116110 A1* | 4/2019 | Raney .................... G06F 8/60 |
| 2020/0287813 A1 | 9/2020 | Kutch et al. |
| 2020/0348918 A1* | 11/2020 | Giannetti ............ G06F 16/2358 |
| 2020/0409671 A1 | 12/2020 | Mazurskiy |
| 2021/0103554 A1* | 4/2021 | Alluboyina ............ G06F 3/065 |
| 2021/0149737 A1 | 5/2021 | An et al. |
| 2021/0233045 A1 | 7/2021 | Singh et al. |
| 2021/0303368 A1* | 9/2021 | Yu ............................ G06F 9/00 |
| 2021/0318913 A1 | 10/2021 | Moyer et al. |
| 2021/0365296 A1* | 11/2021 | Shilane ............... G06F 16/2455 |
| 2021/0374151 A1* | 12/2021 | Huss ..................... G06F 9/541 |
| 2021/0397729 A1 | 12/2021 | Mcquaid |

FOREIGN PATENT DOCUMENTS

| | | |
|---|---|---|
| CN | 110347490 A | 10/2019 |
| CN | 110768833 A | 2/2020 |
| CN | 110806880 A | 2/2020 |

\* cited by examiner

METADATA DRIVEN STATIC DETERMINATION OF CONTROLLER AVAILABILITY

CROSS-REFERENCE TO RELATED APPLICATIONS

This application is a continuation of U.S. patent application Ser. No. 16/913,367 filed Jun. 26, 2020, the contents of which are hereby incorporated by reference in its entirety.

TECHNICAL FIELD

Aspects of the present disclosure relate to container orchestration engines, and more particularly, to determining controller availability.

BACKGROUND

A container orchestration engine (such as the Redhat™ OpenShift™ module) may be a platform for developing and running containerized applications and may allow applications and the data centers that support them to expand from just a few machines and applications to thousands of machines that serve millions of clients. Container orchestration engines may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Container orchestration engines such as Kubernetes can be extended using custom resource definitions (CRDs). CRDs declare and define a new custom resource (CR) which may be picked up by a controller to perform some meaningful action (servicing the CR), such as provision an external system. These CRDs can be used as an extension point for a system. The resource definition of a CR can be annotated with a class to further specify a particular implementation for the CR. For example, a pod auto scaler (the resource) can be implemented in many ways and a user may wish to define one with a specific implementation using class annotations.

However, when a CR is defined, there is no way to know if a controller that can service the CR exists, and thus there is no way to know if anything meaningful will happen with the CR. This problem can be exacerbated if the CR has class annotations defining a specific implementation(s), as it is even less likely that a controller matching the CRs definitions will exist. Because controllers work asynchronously, a user cannot know for certain if their CR will be serviced or not. Currently, upon defining a new CR, container orchestration engines wait for a timeout and then assume that no controller that can service the new CR exists.

The present disclosure addresses the above-noted and other deficiencies by using a processing device to annotate a corresponding deployment of each of a plurality of controllers with filter metadata obtained from the controller. The filter metadata of a controller comprises at least an object type that the controller is to service, and may also include class filter information corresponding to particular implementations of the object type that the controller is to service. In response to generating a custom resource (CR), the processing device may compare the definitions of the CR with the filter metadata from each of the plurality of controllers, wherein the definitions of the CR comprise at least an object type of the CR, and may also include class annotations indicating a particular implementation(s) of the object type for the CR. The processing device may read the filter metadata for each controller from the controller's corresponding deployment. In response to determining that none of the plurality of controllers have filter metadata matching the definitions of the CR, the processing device may provide to a user a no-match alert indicating that there is no controller among the plurality of controllers that can service the CR. In response to determining that the filter metadata of one or more of the plurality of controllers matches the definitions of the CR, the processing device may provide to the user a match alert indicating that there is a controller that can service the CR.

Figure 1:
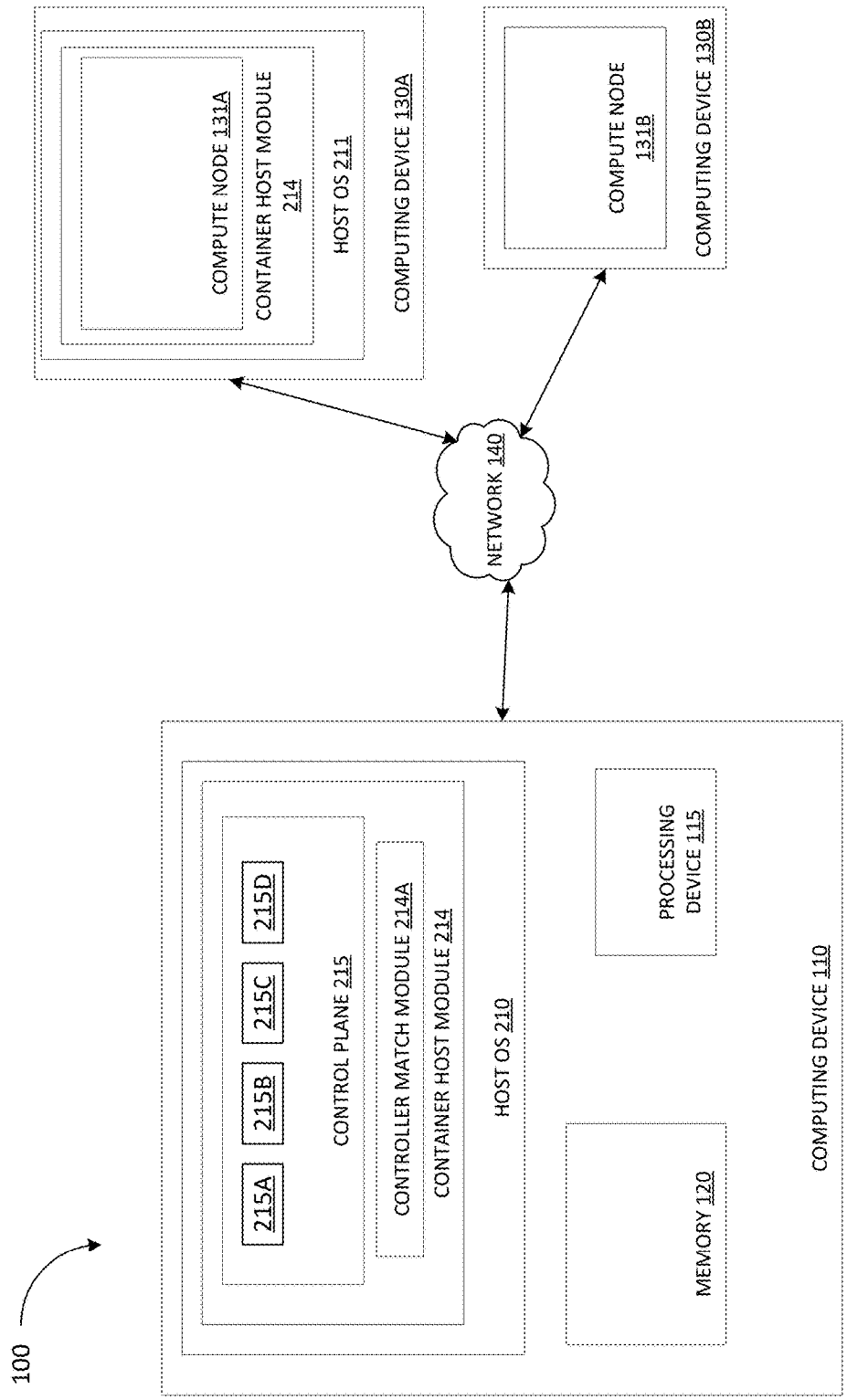
FIG. 1 is a block diagram that illustrates an example system, in accordance with some embodiments of the present disclosure.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 214 may work with are called pods. A pod may refer to one or more containers deployed together on a single host, and the smallest compute unit that can be defined, deployed, and managed. Each pod is allocated its own internal IP address, and therefore may own its entire port space. A user (e.g., via the container host module 214) may define the entrypoint script of a pod to instruct the pod to configure itself as a unique simulated compute node with its own IP addresses and simulated network stacks and communicate with the internal API of the control plane. Containers within pods may share their local storage and networking. In some embodiments, pods have a lifecycle in which they are defined, they are assigned to run on a node, and they run until their container(s) exit or they are removed based on their policy and exit code. Although a pod may contain one or more than one container, the pod is the single unit that a user may deploy, scale, and manage. The control plane 215 of the container host 214 may include controllers 215A-D, one or more of which may be e.g., a replication controller that indicates how many pod replicas are required to run at a time and may be used to automatically scale an application to adapt to its current demand.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of worker nodes 131, including worker nodes 131A and 131B (also referred to as compute machines). The worker nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

The control plane 215 may include REST APIs (not shown) (e.g., Kubernetes APIs) which expose objects, as well as controllers 215A-D which read those APIs, apply changes to objects, and report status or write back to objects. Objects may be persistent entities in the container host 214, which are used to represent the state of the cluster 131 (e.g., deployments, replicasets, and pods). The control plane 215 may run an API server (not shown) (e.g., Kubernetes API server) that validates and configures the data for objects such as e.g., pods, services, and controllers as well as provides a focal point for the cluster 131's shared state. A resource may refer to an endpoint that stores a collection of API objects of a certain type (e.g., deployment, service, namespace, etc).

In a multilevel hierarchy, there may be many scenarios where there are resources that control other resources. For example, a deployment may control a replicaset, which in turn may control a pod. A deployment is an object that provides declarative updates for pods and replicasets. A desired state may be described in a deployment, and a deployment controller may change the actual state to the desired state at a controlled rate. For example, deployments may be defined to create new replicasets, or to remove existing deployments and adopt all their resources with new deployments.

Controllers 215A-D may observe the state of the cluster 131 via the API server and look for events corresponding to changes either to the desired state of resources (e.g., create, update, delete) or the cluster (e.g., pod or node dies). Controllers 215A-D may then make changes to the cluster 131 to ensure that the current state matches the desired state described by the observed resource (referred to as reconciling). Each controller 215A-D observes and reconciles certain object types (as defined by the controller's filter metadata, discussed in further detail herein). The controllers 215A-D actuate objects after they are written by observing object types, and then triggering reconciles from events. After an object is created/updated/deleted, controllers observing that object type will receive a notification that the object has been changed, and they may read the state of the cluster 131 to see what has changed (instead of relying on the event for this information). For example, when a user wishes to scale up a deployment, a request may be sent to the API server with the new desired configuration. The API server in return publishes the change which is read by the deployment controller observing the deployment. Thus, the deployment controller creates one or more pods to conform to the new definition. A new pod creation is, in itself, a new change that the API server also broadcasts to all event listeners. So, if there are any actions that should get triggered upon creation of a new pod, they may be registered automatically.

The container host 214 may also attach metadata to objects. For example, the container host 214 may use labels, which may provide identifying metadata for the entire hierarchy of a cluster including pods, services, deployment/replication controllers, and namespaces. In this way, labels can be used to select objects and to find collections of objects that satisfy certain conditions. Although embodiments of the present disclosure are described with respect to labels for simplicity, any appropriate means of attaching metadata to objects may be used such as annotations, for example. Labels may comprise key/value pairs. Valid label keys may have two segments: an optional prefix and name, separated by a slash (/).

The REST APIs can be extended using special objects called Custom Resource Definitions (CRDs). A CRD object defines a new, unique object type in the cluster and allows the API server to handle its entire lifecycle. Custom Resource (CR) objects (hereinafter referred to as custom resources, or CRs) are created from CRDs that have been added to the cluster by a cluster administrator, allowing all cluster users to add the new object type into projects. When a cluster administrator adds a new CRD to the cluster, the API server reacts by creating a new RESTful resource path that can be accessed by the entire cluster or a single project (namespace) and begins serving the specified CR. In addition, a user may extend the CR's definitions by annotating the CR with one or more classes the CR object is to operate with. A class annotation may allow the user to select a specific implementation for the CR, for example. As discussed herein, the annotation may be in the form of an annotation, a label, or any other appropriate means of attaching metadata to an object. For example, a user may define a CRD called NetworkConfiguration, whose definitions may specify NetworkConfiguration as an object type. If the user wishes to define a NetworkConfiguration implemented using parameters X, Y, and Z, then they may annotate the CR with class parameters X, Y, and Z. Thus, the CR definitions may include an object type as well as one or more class parameters (indicating e.g., a specific implementation). Although discussed in terms of a single implementation, (e.g., using parameters X, Y, and Z) the user could also annotate the CR so as to specify multiple implementations.

Each CR requires a controller (reconciler) to perform some meaningful function with it. For example, when an EtcdCluster CRD is created, a controller may take the corresponding CR object and deploy an etcd cluster with it. However, when a new CR is added to the cluster 131, there is no way for a user to know if a controller that will service the CR exists. As used herein, servicing a CR may refer to observing/reconciling the object type of the CR as defined in its corresponding CRD. Using the NetworkConfiguration example discussed above, there may be multiple controllers 215A-D that service NetworkConfiguration CRs, however each of them may only service a specific implementation (e.g., as defined by their class filters in their filter metadata) of NetworkConfiguration. There is no way for a user to know if a controller exists that services observes/reconciles configuration type objects with class parameters X, Y, and Z. Indeed, a controller that observes/reconciles NetworkConfiguration type objects itself may not even exist and there is no way for the user to know this either.

Embodiments of the present disclosure overcome this problem by annotating deployments with filter metadata of their corresponding deployment controllers, so that the container host 214 may obtain the filter metadata for each controller from the corresponding annotated deployment and compare it to a CR's definitions and provide feedback to the user regarding whether a controller that can service the CR exists. In some embodiments, the container host 214 may include a controller match module 214A, which may be executed along with the rest of container host 214 by processing device 115 in order to perform one or more of the functions described herein. Although illustrated as a module included within container host 214, in some embodiments, controller match module 214A may be implemented as firmware in processing device 115. In other embodiments, controller match module 214A may be separate from the processing device 115 (e.g., may be a separate circuit, field programmable gate array (FPGA), application specific integrated circuit (ASIC), a process running on another processing device, etc.).

Figure 2:
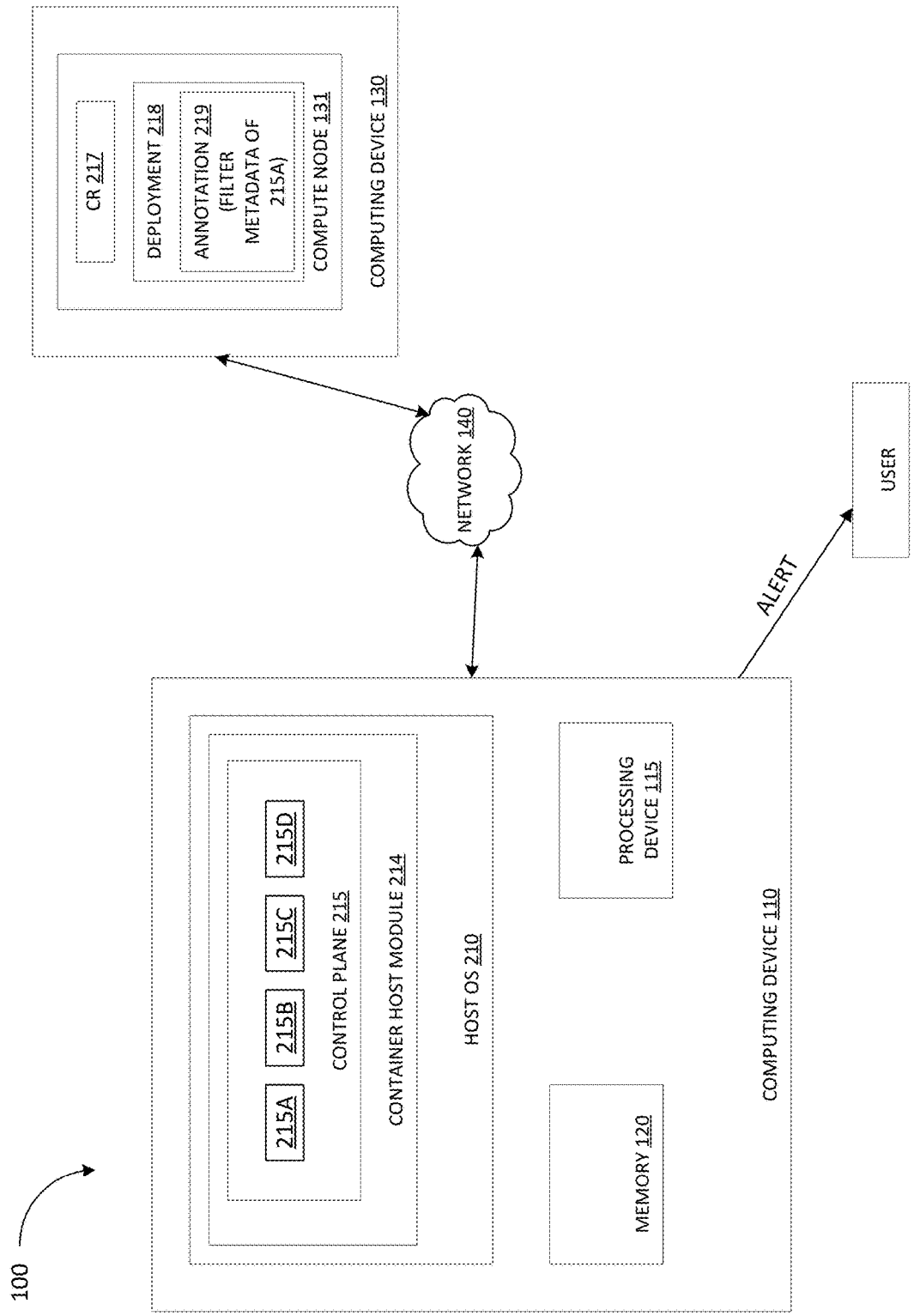
FIG. 2 is a block diagram that illustrates an example system, in accordance with some embodiments of the present disclosure.

Referring simultaneously to FIG. 2, when a deployment 218 is created (e.g., by applying a deployment resource to the REST APIs), a corresponding deployment controller 215A may be defined. The deployment controller 215A may be defined in a new YAML file, which may include metadata indicating various parameters of the controller 215A, such as filter metadata including the object type the deployment controller 215A will observe/reconcile and the particular class filters (if applicable) it uses. In some embodiments, the filter metadata may be in the form of type-filter tuples. For example, if deployment 218 is a pod auto-scaler, the deployment controller 215A for the pod auto-scaler may include filter metadata defining its filter as follows:
Kubernetes.io/reconciler: "podautoscalers.autoscaling.knative.dev;
class=kpa.autoscaling.knative.dev"

This filter metadata may be used to create an annotation 219 (e.g., in the form of an annotation or label) that is applied to the deployment 218 so that the deployment 218 can indicate the object type as well as any particular classes of the object type that the deployment controller 215A will observe/reconcile. For example, the controller match module 214A may generate a label where "Kubernetes.io/reconciler" is the key of the label the controller match module 214A may look for, while the value of the label comprises "podautoscalers.autoscaling.knative.dev," which is the object type reconciled, and "class=kpa.autoscaling.knative.dev," which is the class filter applied to the resources. The controller match module 214A may annotate the deployment 218 (corresponding to deployment controller 215A) with the label (e.g., the annotation 219). Although discussed using a label, the controller match module 214A may also generate an annotation using the filter metadata and annotate the deployment 218 with the annotation.

It should be noted that since a deployment may include many controllers, the above example can be extended to a list of tuples, rather than a single tuple. The controller match module 214A may obtain the filter metadata for each controller 215A-D and annotate a corresponding deployment (not shown) of the controller with it.

In response to the creation of a CR 217, the controller match module 214A may obtain the filter metadata for each of the controllers 215A-D from the annotations to their corresponding deployments. In some embodiments, each deployment may advertise their corresponding controller's filter metadata to the controller match module 214A. This may be done periodically, or in response to a request from the controller match module 214A. In some embodiments, each controller 215A-D may launch an API, which may provide its filter metadata to the controller match module 214A upon request.

The controller match module 214A may compare the definitions of the CR 217 to the filter metadata of each controller 215A-D to determine if there is a match. The definitions of the CR 217 may match the filter metadata of a controller 215A-D if the object type of the CR 217 matches the object type that the controller 215A-D is meant to observe and reconcile, and the class parameters of the CR 217 (if any) match the class filters indicated by the filter metadata of the controller (e.g., are of the class that the controller is to observe/reconcile). As discussed above, the definitions of the CR 217 may comprise an object type, as well as class parameters to further specify e.g., an implementation(s) of the CR 217. If a match is detected, the controller match module 214A may provide an indication to the user that a controller that can service their CR 217 exists. As used herein, servicing a CR may refer to observing/reconciling the CR object type as defined in the CRD. If no match is detected, the controller match module 214A may provide a no-match alert to the user indicating that there is no controller that can service their CR. In some embodiments, the controller match module 214A may provide additional information in the no-match alert, such as a recommendation to double check the definitions of the CR 217.

In some embodiments, in response to determining that none of the controllers 215A-D have filter metadata matching the definitions of the CR 217, the controller match module 214A may determine if a partial match is detected. If a partial match is detected, the controller match module 214A may include in the no-match alert, an indication of which controllers 215A-D were a partial match. In some embodiments, the definitions of CR 217 may be a partial match with filter metadata of a controller 215A-D if the object type of the CR 217 matches the object type that the controller observes/reconciles (regardless of whether any class parameters match). In other embodiments, the definitions of a CR may be a partial match with filter metadata of a controller if the object type of the CR matches the object type that the controller observes/reconciles and one or more class parameters match the class filters of the controller. For example, the controller match module 214A may determine a partial match if the object type of the CR matches the object type that the controller observes/reconciles and a majority (e.g., 2 of 3, or 3 of 5) of the class parameters match the class filters of the controller. For each controller that the controller match module 214A determines is a partial match for the CR 217, the controller match module 214A may include an indication of that controller in the no-match alert. In some embodiments, the controller match module 214A may provide additional information, such as an indication that the filter metadata of each indicated controller that partially matches the CR 217 is a possible alternate definition for the CR 217.

Figure 3:
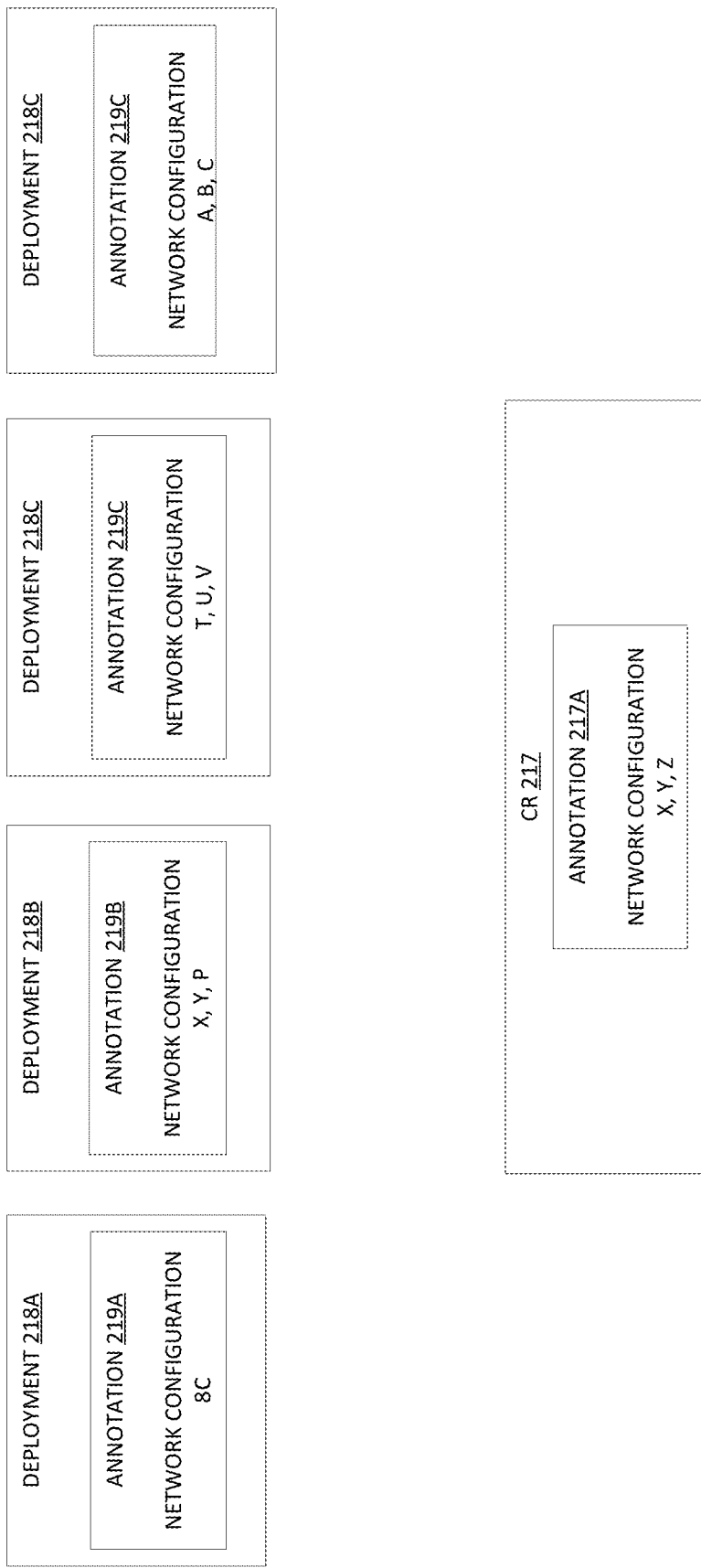
FIG. 3 is a block diagram illustrating the comparison of the definitions of a custom resource (CR) object with filter metadata of a plurality of controllers, in accordance with some embodiments of the present disclosure.

FIG. 3 illustrates a comparison of the definitions of the CR 217 with the filter metadata of each of the controllers 215A-D, read from annotations to the corresponding deployments 218A-D. As can be seen, the CR 217 has network configuration as the object type, and each of the deployments 218A-D indicates that the object type observed/reconciled by their corresponding controller is also network configuration. Thus, the controller match module 214A may determine that the object types match. However, upon comparing the class annotations of the CR 217 to the class filters of each of the controllers 215A-D, FIG. 3 shows that none of the controllers have class filters that match the class annotations of the CR 217. Therefore, the controller match module 214A may determine that there is no controller that can service CR 217 and send a no-match alert to the user. However, the controller match module 214A may also determine that a majority of the class parameters of the CR 217 have a match with the class filters of controller 215B (as indicated by the annotations to deployment 218B), and thus may determine that the filter metadata of controller 215B is a partial match with the definitions of CR 217. As a result, the controller match module 214A may include in the no-match alert an indication that the filter metadata of controller 215B is a partial match with the definitions of CR 217 and may be used as an alternative definition for the CR 217.

Figure 4:
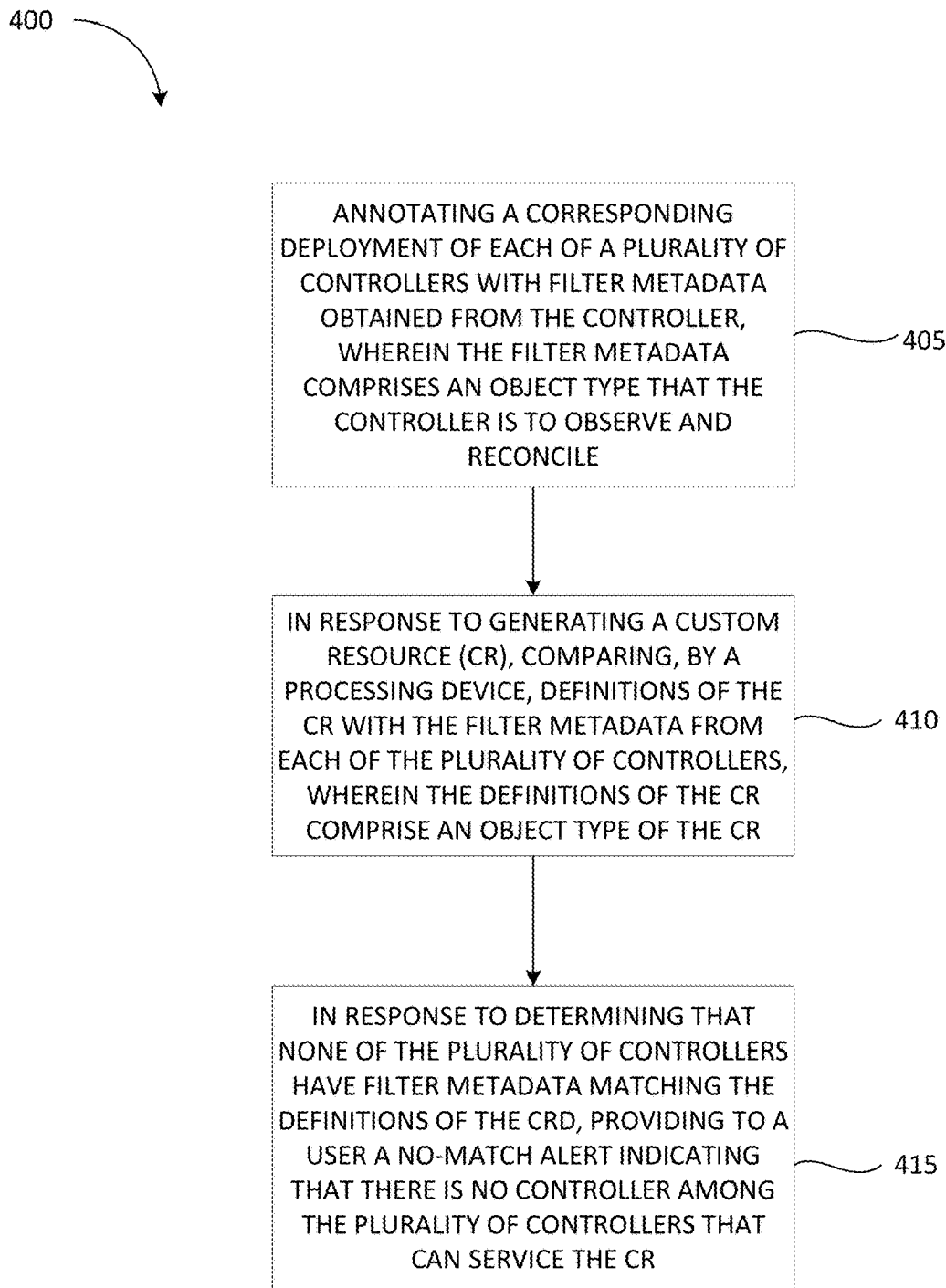
FIG. 4 is a flow diagram of a method for determining if a controller that can service a CR exists, in accordance with some embodiments of the present disclosure.

FIG. 4 is a flow diagram of a method 400 for determining if a controller that can service a CRD exists, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof in some embodiments, the method 400 may be performed by a computing device (e.g., computing device 110 illustrated in FIGS. 1 and 2).

At block 405, computing device 110 (executing container host 214 and thus controller match module 214A) may annotate a corresponding deployment of each of a plurality of controllers with filter metadata obtained from the controller. The filter metadata may comprise an object type that the controller is to observe/reconcile. More specifically (and also referring to FIGS. 1 and 2), when a deployment 218 is created (e.g., by applying a deployment resource to the REST APIs), computing device 110 may define a corresponding deployment controller 215A. The deployment controller 215A may be defined in a new YAML file, which may include metadata indicating various parameters of the controller 215A, such as filter metadata including the object type the deployment controller 215A will observe/reconcile and the particular class filters (if applicable) it uses. The filter metadata may be in the form of type-filter tuples. For example, if deployment 218 is a pod auto-scaler, the deployment controller 215A for the pod auto-scaler may include filter metadata defining its filter as follows:
Kubernetes.io/reconciler: "podautoscalers.autoscaling.knative.dev;
class=kpa.autoscaling.knative.dev"

This filter metadata may be used to create annotations or labels that are applied to the deployment 218 so that the deployment 218 can indicate the object type as well as the particular classes within the object type that the deployment controller 215A will observe/reconcile. For example, the computing device 110 (via controller match module 214A) may generate a label where "Kubernetes.io/reconciler" is the key of the label the controller match module 214A may look for, while the value of the label comprises "podautoscalers.autoscaling.knative.dev," which is the object type reconciled, and "class=kpa.autoscaling.knative.dev," which is the class filter applied to the resources. The computing device 110 may annotate the deployment 218 (corresponding to deployment controller 215A) with the label. Although discussed using a label, the computing device 110 may also generate an annotation using the filter metadata and annotate the deployment 218 with the annotation.

It should be noted that since a deployment may include many controllers, the above example can be extended to a list of tuples, rather than a single tuple. The computing device 110 may obtain the filter metadata for each controller 215A-D and annotate a corresponding deployment (not shown) of the controller with it.

At block 410, in response to the creation of a CR 217, the computing device 110 may compare the definitions of the CR 217 to the filter metadata of each controller 215A-D to determine if there is a match. More specifically, computing device 110 may obtain the filter metadata for each of the controllers 215A-D from the annotations to their corresponding deployments. In some embodiments, for each deployment, computing device 110 may advertise the corresponding controller's filter metadata to the controller match module 214A. This may be done periodically, or in response to a request from the controller match module 214A. In some embodiments, the computing device 110 may launch an API for each controller 215A-D, which may provide the controller's filter metadata to the controller match module 214A upon request.

The computing device 110 may compare the definitions of the CR 217 to the filter metadata of each controller 215A-D to determine if there is a match. As discussed above, the definitions of the CR 217 may comprise an object type, as well as class parameters to further specify e.g., an implementation(s) of the CR 217. If a match is detected, the computing device 110 may provide an indication to the user that a controller that can service their CR 217 exists. As used herein, servicing a CR may refer to observing/reconciling the CR object type as defined in the CRD. At block 415, if no match is detected, the computing device 110 may provide a no-match alert to the user indicating that there is no controller that can service their CRD 217. In some embodiments, the computing device 110 may provide additional information in the no-match alert, such as a recommendation to double check the definitions of the CR 217.

Figure 5:
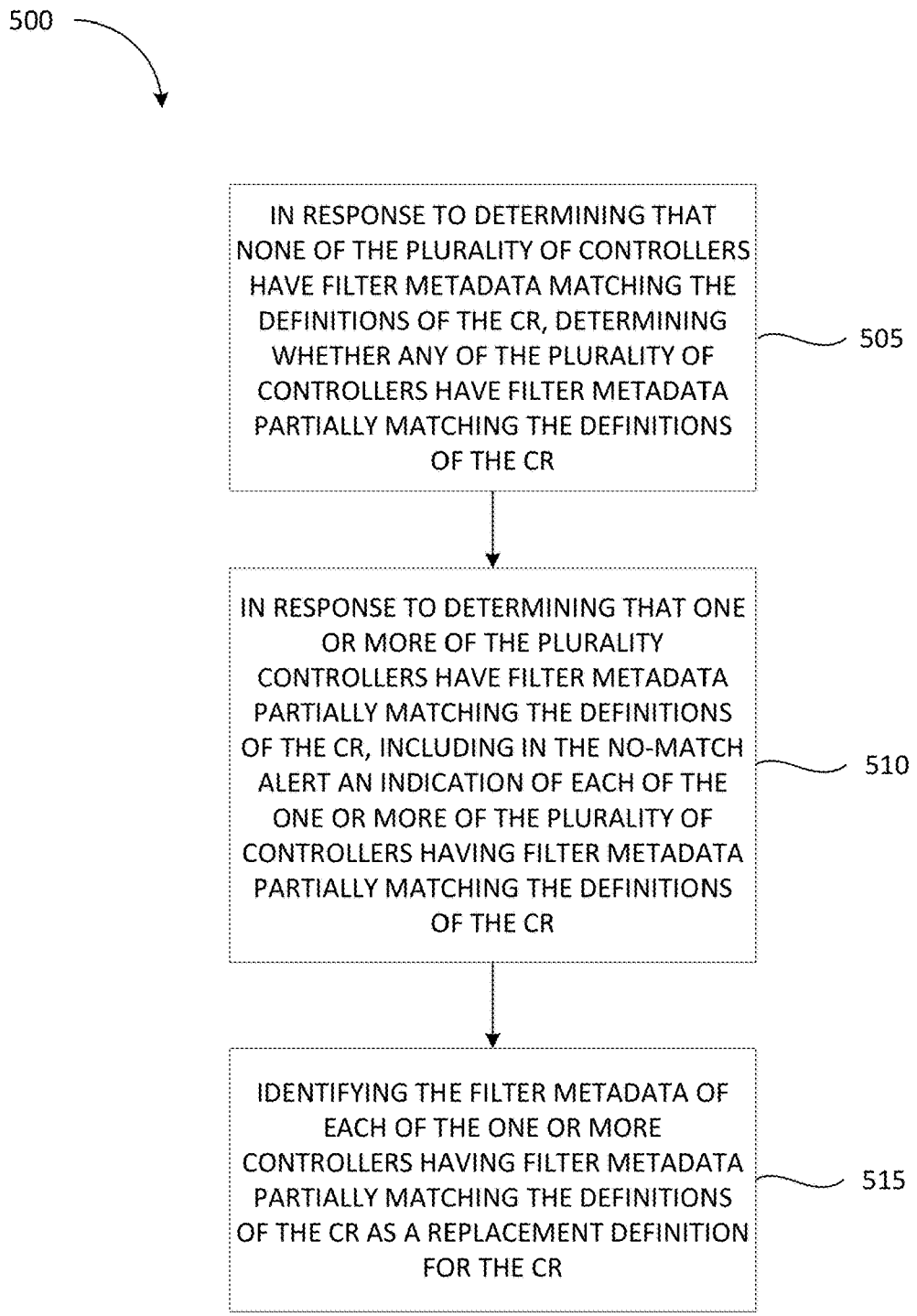
FIG. 5 is a flow diagram of a method for determining if a controller that can service a CR exists, in accordance with some embodiments of the present disclosure.

FIG. 5 is a flow diagram of a method 500 of for determining if a controller that can service a CRD exists, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof in some embodiments, the method 500 may be performed by a computing device (e.g., computing device 110 illustrated in FIGS. 1 and 2).

Referring also to FIGS. 1 and 2, at block 505, in response to determining that none of the controllers 215A-D have filter metadata matching the definitions of the CR 217, the computing device 110 may determine if a partial match is detected. If a partial match is detected, the computing device 110 may include in the no-match alert, an indication of which controllers 215A-D were a partial match. In some embodiments, the definitions of CR 217 may be a partial match with filter metadata of a controller 215A-D if the object type of the CR 217 matches the object type that the controller observes/reconciles (regardless of whether any class parameters match). In other embodiments, the definitions of a CR may be a partial match with filter metadata of a controller if the object type of the CR matches the object type that the controller observes/reconciles and one or more class parameters match the class filters of the controller. For example, the computing device 110 may determine a partial match if the object type of a CR matches the object type that the controller observes/reconciles and a majority (e.g., 2 of 3, or 3 of 5) of the class parameters match the class filters of the controller. At block 510, for each controller 215A-D that the controller match module 214A determines is a partial match for the CR 217, the computing device 110 may include an indication of that controller in the no-match alert. At block 515, the computing device 110 may provide additional information in the no-match alert, such as an indication that the filter metadata of each indicated controller 215A-D that partially matches the definitions of CR 217 is a possible alternate definition for the CR 217.

Figure 6:
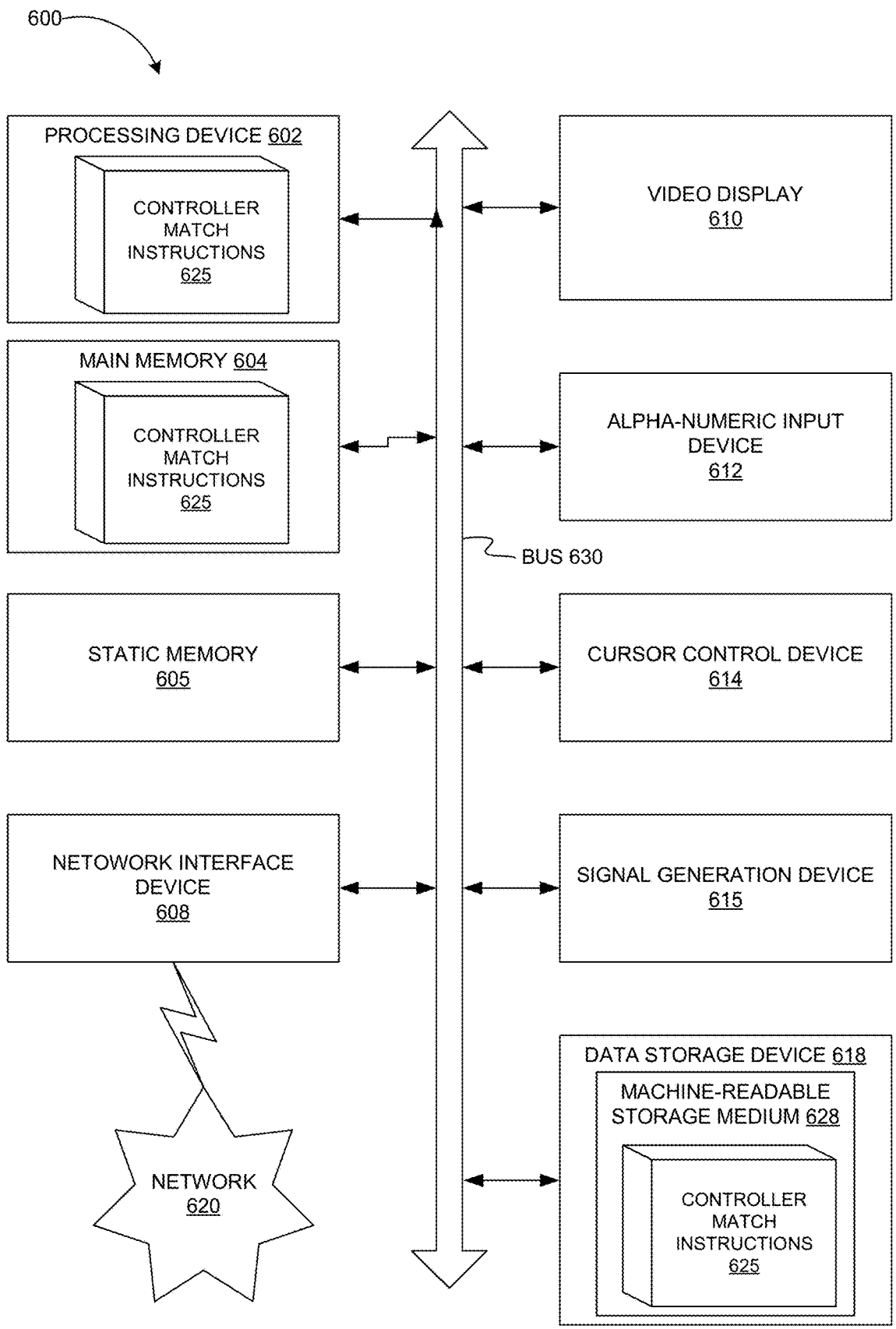
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for determining if there is a controller that can service a CRD. More specifically, the machine may to annotate a corresponding deployment of each of a plurality of controllers with filter metadata obtained from the controller. The filter metadata of a controller comprises at least an object type that the controller is to service, and may also include class filter information corresponding to particular implementations of the object type that the controller is to service.

In response to generating a custom resource (CR), the machine may compare the definitions of the CR with the filter metadata from each of the plurality of controllers, wherein the definitions of the CR comprise at least an object type of the CR, and may also include class annotations indicating a particular implementation(s) of the object type for the CR. In response to determining that none of the plurality of controllers have filter metadata matching the definitions of the CR, the machine may provide to a user a no-match alert indicating that there is no controller among the plurality of controllers that can service the CR. In response to determining that the filter metadata of one or more of the plurality of controllers matches the definitions of the CR, the machine may provide to the user a match alert indicating that there is a controller that can service the CR.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute controller match instructions 625, for performing the operations and steps discussed herein.

The data storage device 618 may include a machine-readable storage medium 628, on which is stored one or more sets of controller match instructions 625 (e.g., software) embodying any one or more of the methodologies of functions described herein. The controller match instructions 625 may also reside, completely or at least partially, within the main memory 604 or within the processing device 602 during execution thereof by the computer system 600; the main memory 604 and the processing device 602 also constituting machine-readable storage media. The function compilation instructions 625 may further be transmitted or received over a network 620 via the network interface device 608.

The machine-readable storage medium 628 may also be used to store instructions to perform a method for determining if a controller that can service a CRD exists, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   evaluating a custom resource (CR); and
   comparing, by a processing device, definitions of the CR with filter metadata from each of a plurality of controllers to determine whether a controller among the plurality of controllers can service the CR based on the filter metadata associated with each of the plurality of controllers, wherein the definitions of the CR comprise an object type of the CR.

2. The method of claim 1, further comprising:
   in response to determining a controller among a plurality of controllers can service the CR, providing an alert indicating that there is the controller that can service the CR.

3. The method of claim 1, wherein the filter metadata of each of the plurality of controllers comprises one or more class filters indicating classes of the object type that the controller is to observe and reconcile, and the definitions of the CR further comprise one or more class annotations indicating one or more classes of the object type of the CR that the CR is to operate with.

4. The method of claim 1, further comprising:
   in response to determining that none of the plurality of controllers have filter metadata matching the definitions of the CR, determining whether any of the plurality of controllers have filter metadata partially matching the definitions of the CR.

5. The method of claim 1, further comprising:
   obtaining each of a plurality of deployments in response to evaluating the CR and reading the filter metadata of each of the plurality of controllers from a corresponding one of the plurality of deployments.

6. The method of claim 1, further comprising:
   generating for each of the plurality of controllers, an application program interface (API) to provide the filter metadata for that controller in response to a request.

7. A system comprising:
   a memory; and
   a processing device operatively coupled to the memory, the processing device to:
   evaluate a custom resource (CR); and
   compare definitions of the CR with filter metadata from each of a plurality of controllers to determine whether a controller among the plurality of controllers can service the CR based on the filter metadata associated with each of the plurality of controllers, wherein the definitions of the CR comprise an object type of the CR.

8. The system of claim 7, wherein the processing device is further to:
in response to determining a controller among a plurality of controllers can service the CR, provide an alert indicating that there is the controller that can service the CR.

9. The system of claim 7, wherein the filter metadata of each of the plurality of controllers comprises one or more class filters indicating classes of the object type that the controller is to observe and reconcile, and the definitions of the CR further comprise one or more class annotations indicating one or more classes of the object type of the CR that the CR is to operate with.

10. The system of claim 7, wherein the processing device is further to:
in response to determining that none of the plurality of controllers have filter metadata matching the definitions of the CR, determine whether any of the plurality of controllers have filter metadata partially matching the definitions of the CR.

11. The system of claim 7, wherein the processing device is further to:
generate for each of the plurality of controllers, an application program interface (API) to provide the filter metadata for each of the plurality of controllers in response to a request.

12. The system of claim 9, wherein the processing device is further to:
generate for each of the plurality of controllers, an application program interface (API) to provide the filter metadata for that controller in response to a request.

13. A non-transitory computer readable medium having instructions stored thereon that, when executed by a processing device, cause the processing device to:
evaluate a custom resource (CR); and
compare, by the processing device, definitions of the CR with filter metadata from each of a plurality of controllers to determine whether a controller among a plurality of controllers can service the CR based on filter metadata associated with each of the plurality of controllers, wherein the definitions of the CR comprise an object type of the CR.

14. The non-transitory computer readable medium of claim 13, wherein the processing device is further to:
in response to determining a controller among a plurality of controllers can service the CR, provide an alert indicating that there is the controller that can service the CR.

15. The non-transitory computer readable medium of claim 13, wherein the filter metadata of each of the plurality of controllers comprises one or more class filters indicating classes of the object type that the controller is to observe and reconcile, and the definitions of the CR further comprise one or more class annotations indicating one or more classes of the object type of the CR that the CR is to operate with.

16. The non-transitory computer readable medium of claim 13, wherein the processing device is further to:
in response to determining that none of the plurality of controllers have filter metadata matching the definitions of the CR, determine whether any of the plurality of controllers have filter metadata partially matching the definitions of the CR.

17. The non-transitory computer readable medium of claim 13, wherein the processing device is further to:
generate for each of the plurality of controllers, an application program interface (API) to provide the filter metadata for that controller in response to a request.

* * * * *